(12) United States Patent
Choquette et al.

(10) Patent No.: US 8,366,134 B1
(45) Date of Patent: Feb. 5, 2013

(54) SLIDABLE FIFTH WHEEL HITCH WITH AUTOMATIC LOCKING LATCH

(75) Inventors: Paul Choquette, Lincoln, NE (US); Leslie Roeber, Emerson, NE (US)

(73) Assignee: Automatic Equipment Manufacturing Company, Pender, NE (US)

( * ) Notice: Subject to any disclaimer, the term of this patent is extended or adjusted under 35 U.S.C. 154(b) by 222 days.

(21) Appl. No.: 12/932,490

(22) Filed: Feb. 28, 2011

(51) Int. Cl.
*B62D 53/06* (2006.01)
(52) U.S. Cl. ..................................... 280/441.1; 280/477
(58) Field of Classification Search .................. 280/477, 280/441.1, 438.1
See application file for complete search history.

(56) References Cited

U.S. PATENT DOCUMENTS

| | | | | |
|---|---|---|---|---|
| 3,063,739 | A * | 11/1962 | Davies | 280/441.1 |
| 5,772,229 | A | 6/1998 | Cattau | |
| 6,170,849 | B1 * | 1/2001 | McCall | 280/433 |
| 6,308,977 | B1 | 10/2001 | Pulliam et al. | |
| 6,474,674 | B2 * | 11/2002 | Piercey, III | 280/441 |
| 6,981,715 | B1 * | 1/2006 | Aylett | 280/441 |
| 7,490,846 | B2 | 2/2009 | Kaun | |
| 7,506,886 | B2 | 3/2009 | Warnock | |
| 7,753,392 | B2 | 7/2010 | Warnock | |
| 2001/0020776 | A1 * | 9/2001 | Linger et al. | 280/441 |
| 2002/0149171 | A1 * | 10/2002 | Linger et al. | 280/441 |
| 2003/0034631 | A1 * | 2/2003 | Lindenman et al. | 280/438.1 |
| 2006/0186636 | A1 * | 8/2006 | Schutt et al. | 280/477 |

* cited by examiner

*Primary Examiner* — Tashiana Adams
(74) *Attorney, Agent, or Firm* — Donald R. Schoonover

(57) ABSTRACT

An apparatus for connecting a kingpin of a gooseneck or fifth wheel trailer to a towing vehicle includes a fifth wheel hitch having a hitch platform with a hitch head slidably mounted on the rails of a base platform; an articulating mechanism to displace the hitch platform to and from a forward towing station and a rearward towing station; and a latch having a latch pin to automatically lock the hitch platform at the forward and rearward towing stations and also having a biased spider device to automatically prevent the latch pin from re-locking the hitch platform when the hitch platform is released from a towing station until after the hitch platform has been displaced away from that towing station.

14 Claims, 10 Drawing Sheets

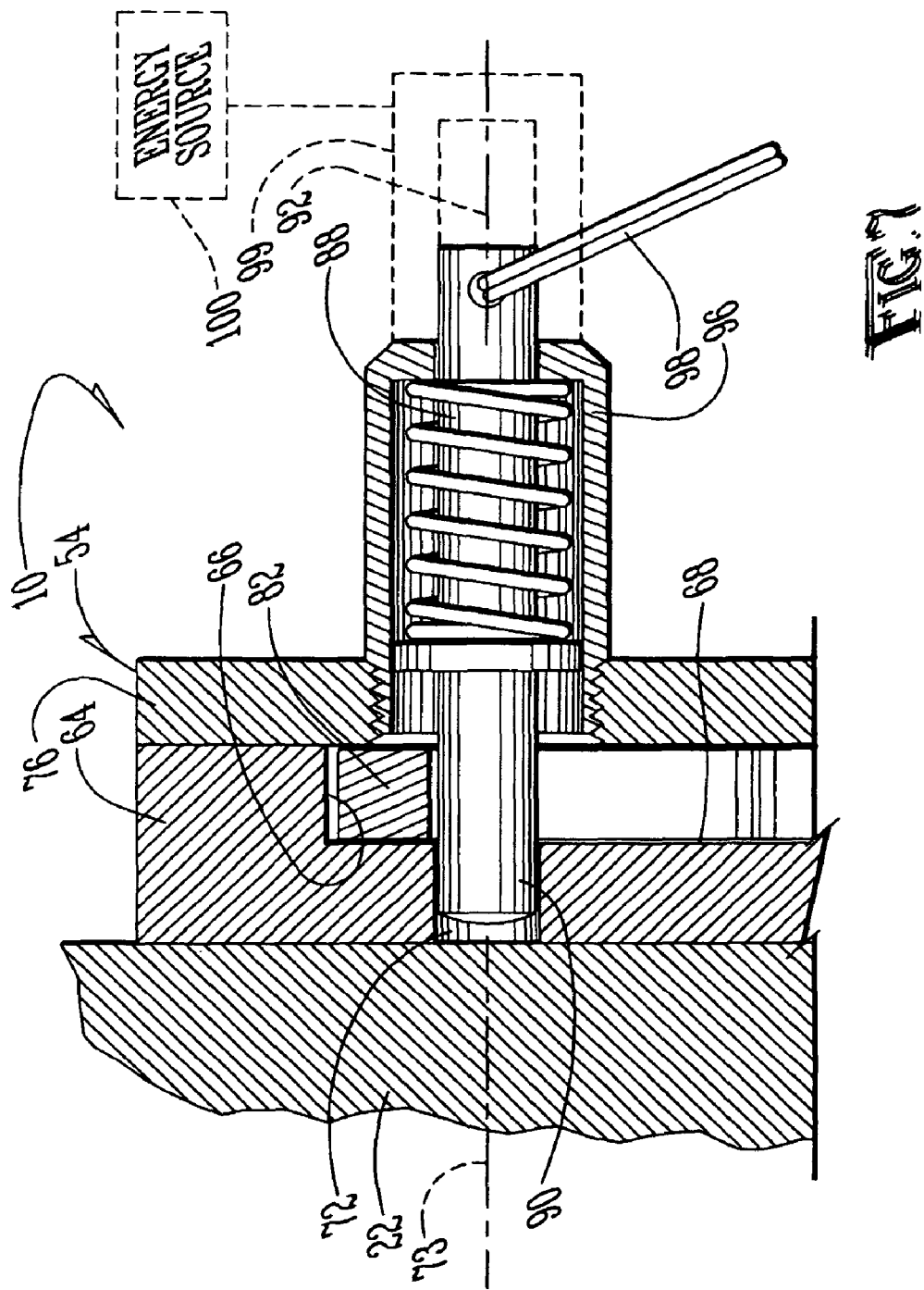

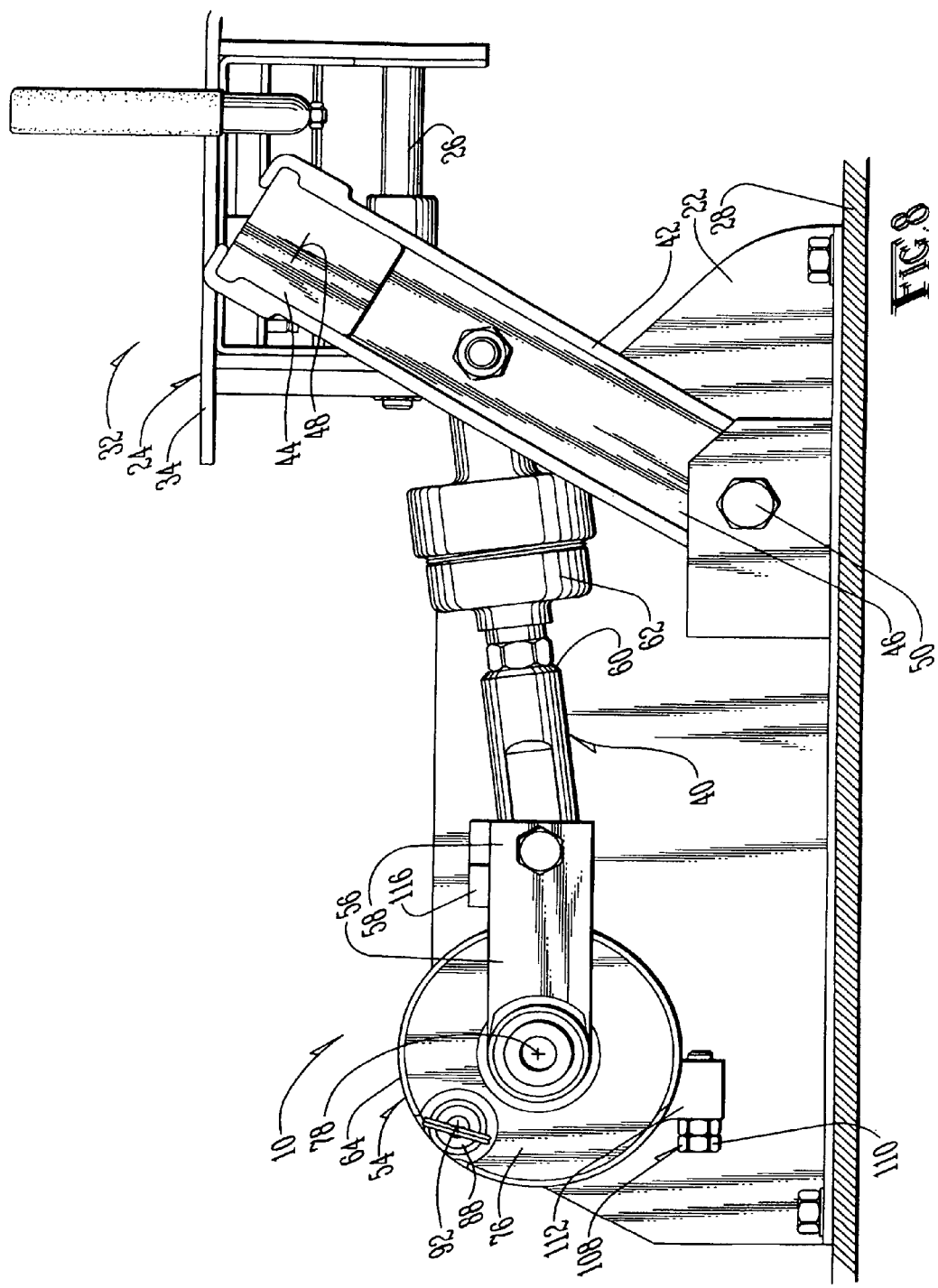

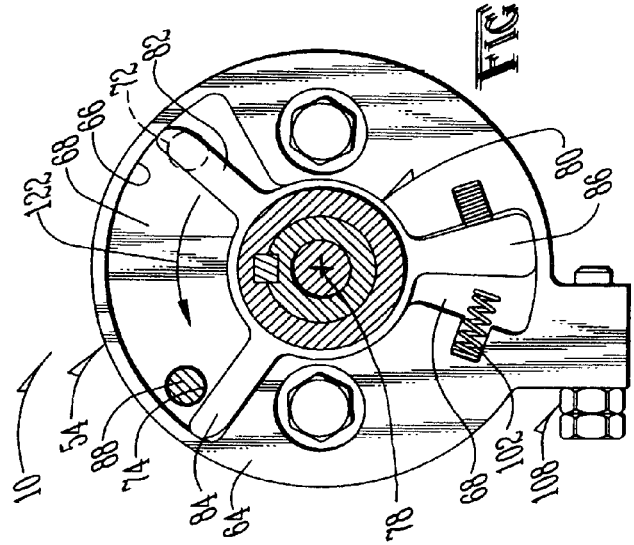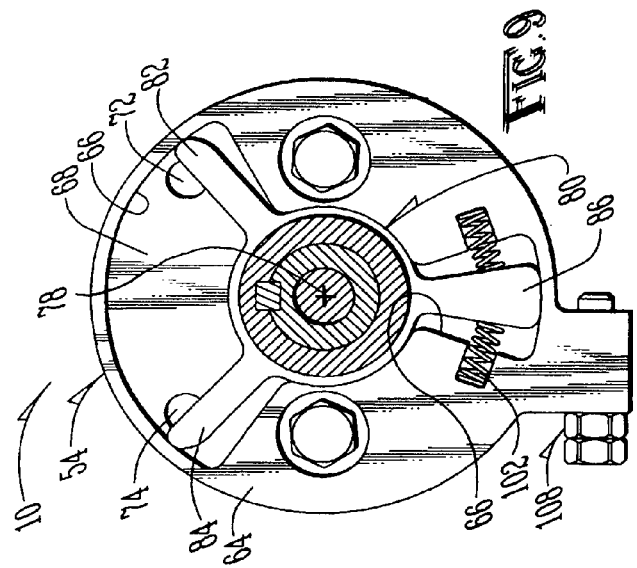

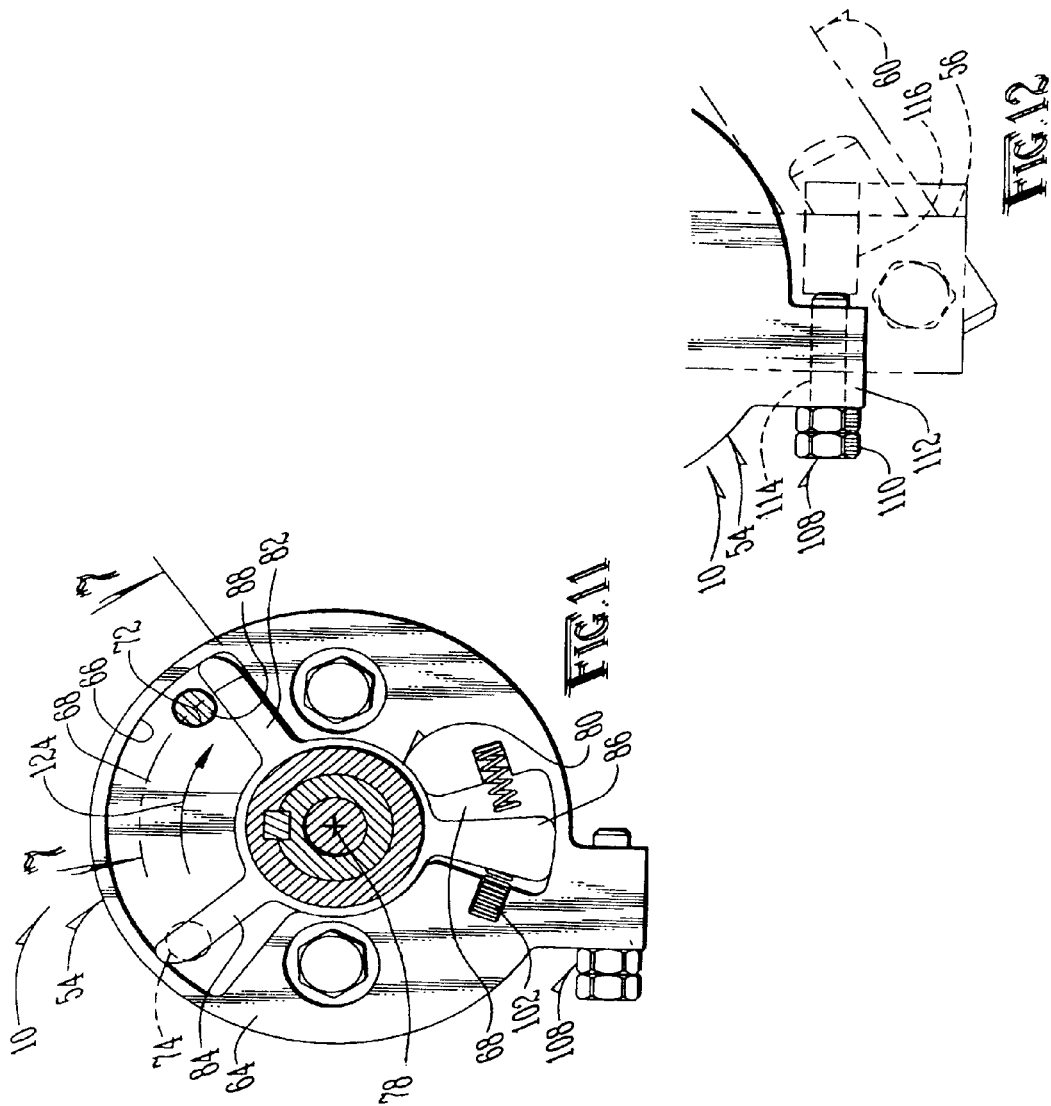

SLIDABLE FIFTH WHEEL HITCH WITH AUTOMATIC LOCKING LATCH

BACKGROUND OF THE INVENTION

1. Field of the Invention

The present invention relates to towing accessories and, more particularly without limitation, to hitches for connecting a gooseneck or gooseneck fifth wheel trailer to a towing vehicle.

2. Description of the Related Art

A fifth wheel hitch is used to connect a gooseneck trailer or fifth wheel trailer to a towing vehicle. Although there are variations in which such a trailer is connected to the towing vehicle, typically the trailer includes a cylindrically-shaped kingpin extending vertically-downwardly from a horizontally-oriented trailer plate, with the kingpin having a distal end with a smaller-diameter portion and a larger-diameter portion. The towing vehicle generally includes a fifth wheel hitch having a horizontally-oriented hitch plate. The trailer plate and the hitch plate jointly provide abutting bearing surfaces for operatively supporting the front end of the trailer when the trailer is connected to the fifth wheel hitch of the towing vehicle.

Fifth wheel hitches also generally include an apron extending rearwardly and downwardly from the hitch plate. An access opening for receiving the kingpin is generally centrally-located in the hitch plate with the access opening extending rearwardly to a rear edge of the hitch plate and then continuing downwardly along the apron. The apron and access opening assist a user to properly align and guide the kingpin and the trailer plate as the trailer is being connected to the towing vehicle.

Fifth wheel hitches include a kingpin receiver which generally includes a pair of opposing jaws for lockingly capturing the smaller-diameter portion of the kingpin so the towing vehicle and the trailer can operatively pivot relative to each other about a vertically-oriented pivot axis of the kingpin to accommodate yaw as the trailer is being towed around a corner for example. The fifth wheel hitch may include a gimble mounting to accommodate instantaneous variations in pitch and/or roll attitudes between the towing vehicle and the trailer.

Due to the limited space sometimes available to an operator of a truck towing a fifth wheel trailer, it is not unusual for the operator to find himself in a congested situation which requires substantially greater maneuvering space than may be available, particularly in regard to RV parks having an abundance of trees, narrow lots, and cars parked alongside streets, or narrow mountainous roads when confronted with impassable tunnels or overhead rock abutments for example. An innovation that was developed relatively recently in an attempt to overcome such difficulties are fifth wheel hitches being slidable wherein the location of the vertically-oriented pivot axis of the kingpin can be, at least temporarily, moved closer to, or farther from, the rear end of the towing vehicle. By so moving the pivot axis, the combined turning characteristics of a truck connected in tandem with a fifth wheel trailer may be sufficiently alterable to allow an operator to relatively easily escape from an otherwise seemingly impossible situation.

Also, many recently manufactured trucks have short beds wherein the front to back dimensions thereof are much shorter than the bed dimensions of trucks commonly used for towing fifth wheel trailers. As a result, a short bed truck may not provide the necessary clearance needed for maneuvering turns when used to tow a fifth wheel trailer. Slidable fifth wheel hitches may sometimes be used to provide the desired clearance needed by positioning the fifth wheel pivot axis closer to the rear of the truck, and farther from the rear of the truck when not towing a fifth wheel truck, such as for storage purposes for example.

For many prior art slidable fifth wheel hitches, two persons are sometimes needed to alter the location of the fifth wheel pivot axis: one person to operate the towing vehicle, and another person to oversee and control displacement of the fifth wheel pivot axis. Many times, a user does not have the benefit of an assistant and must work alone thereby sometimes making a difficult situation even more difficult.

What is needed is a slidable fifth wheel hitch wherein a user can easily alter the location of the fifth wheel pivot axis thereof while working alone.

What is also needed is a slidable fifth wheel hitch having a latch which automatically locks the location of a fifth wheel pivot axis of a kingpin in either a forward towing station or a rearward towing station as appropriate.

SUMMARY OF THE INVENTION

The improvements of the present invention for a slidable fifth wheel hitch having an automatic locking latch for connecting a kingpin of a gooseneck or fifth wheel trailer to a towing vehicle includes a hitch platform mounted on the rails of a base platform wherein the hitch platform is displaceable to and from a forward towing station and a rearward towing station relative to the base platform.

The improvements also include a latch having a pin-mounting portion mounted to the base platform to pivot about a transverse horizontally-oriented latch axis, an arm fixedly secured to the pin-mounting portion and having a distal end, a hub having a recess with an inner wall and being pivotable about the latch axis, a rearward bore having a rearward bore axis and a forward bore having a forward bore axis wherein the rearward and forward bores are located in the recess, a latch pin mounted in the pin-mounting portion and having a transverse horizontally-oriented pin axis parallel to the rearward and forward bore axes, a pin-biasing mechanism structured to bias the latch pin along the pin axis toward the inner wall of the recess, a spider device having a rearward leg and a forward leg wherein the spider device is structured to pivot about the latch axis, and a spider-biasing mechanism structured to normally position the rearward leg adjacent to the rearward bore to interfere with access into the rearward bore and to normally position the forward leg adjacent to the forward bore to interfere with access into the forward bore.

The latch is structured wherein as the hitch platform is being displaced to the rearward towing station, the latch pin bears against the forward leg and pivotally displaces the spider device such that the forward leg of the spider device is angularly displaced to thereby allow access into the forward bore by the latch pin and to automatically lock the hitch platform at the rearward towing station, and wherein as the hitch platform is being displaced to the forward towing station, the latch pin bears against the rearward leg and pivotally displaces the spider device such that the rearward leg of the spider device is angularly displaced to thereby allow access into the rearward bore by the latch pin to automatically lock the hitch platform at the forward towing station.

The improvements further include an articulating mechanism structured to pivotally displace the hitch platform to and from the forward towing station and the rearward towing station, the articulating mechanism including a pivot bar having a first end pivotally connected to the hitch platform and a second end pivotally connected to the base platform, and a linkage mechanism having one end thereof pivotally connected to the pivot bar centrally between the first and second ends of the pivot bar, and the other end thereof pivotally connected to the distal end of the arm of the latch, the linkage mechanism including a shock-absorbing device structured to cushion buffeting forces between the hitch and base platforms.

The slidable fifth wheel hitch 10 includes a release device which is structured to enable a user to selectively withdraw the latch pin from the rearward and forward bores to thereby release the hitch platform from the forward and rearward towing stations, respectively, such as a grip and/or a solenoid connected to an energy source, the electrical system of the towing vehicle for example.

As the hitch platform is being released from the rearward towing station, the spider-biasing mechanism automatically and angularly biases the spider device to thereby prevent the latch pin from re-entering the forward bore until after the hitch platform has been displaced away from the rearward towing station.

The slidable fifth wheel hitch 10 may also include a stop mechanism, which provides support for the latch pin when the latch pin is biased into a bore to lock the slidable fifth wheel hitch at a towing station and to facilitate withdrawal of the latch pin from the bore to unlock the slidable fifth wheel hitch from a towing station.

PRINCIPAL OBJECTS AND ADVANTAGES OF THE INVENTION

The principal objects and advantages of the present invention include: providing a slidable fifth wheel hitch wherein a user can selectively and easily alter the location of a fifth wheel axis thereof while working alone; providing such a slidable fifth wheel hitch wherein the hitch platform thereof is automatically locked at either a rearward towing station or a forward towing station when the hitch platform is displaced thereto; providing such a slidable fifth wheel hitch wherein as the hitch is being unlocked from either the rearward towing station or the forward towing station, the hitch is automatically prevented from being re-locked at that towing station until after the hitch platform has been displaced away from that towing station; and generally providing such a slidable fifth wheel hitch that is reliable in performance, capable of long-lasting life, and particularly well adapted for the proposed usages thereof.

Other objects and advantages of this invention will become apparent from the following description taken in conjunction with the accompanying drawings wherein are set forth, by way of illustration and example and without limitation, certain embodiments of this invention.

BRIEF DESCRIPTION OF THE DRAWING FIGURES

FIG. 7 is a still further enlarged, partially cross-sectional view, taken along line 7-7 of FIG. 11, showing the latch pin inserted into the rearward bore locking the slidable fifth wheel hitch at a forward towing station, and also schematically showing an optional solenoid and energy source in dashed lines.

FIG. 8 is a view similar to FIG. 3, but showing the latch pin locking the slidable fifth wheel hitch at the rearward towing station.

FIG. 9 is a further enlarged and partially cross-sectional side elevational view showing the latch of the slidable fifth wheel with the pin-mounting portion removed and showing legs of the spider device positioned to prevent access of the latch pin into the rearward and forward bores of the latch.

FIG. 10 is a further enlarged and partially cross-sectional side elevational view similar to FIG. 9, but showing the spider device pivoted to allow access of the latch pin into the forward bore to thereby lock the slidable fifth wheel hitch at the rearward towing station.

FIG. 11 is a further enlarged and partially cross-sectional side elevational view similar to FIG. 10, but showing the spider device pivoted to allow access of the latch pin into the rearward bore to thereby lock the slidable fifth wheel hitch at the forward towing station.

FIG. 12 is a further enlarged side elevational view of an adjustable stop of the slidable fifth wheel hitch in accordance with the present invention.

DETAILED DESCRIPTION OF THE INVENTION

As required, embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for claims and as a representative basis for teaching one skilled in the art to variously employ the present invention in virtually any appropriately detailed structure.

Figure 1:
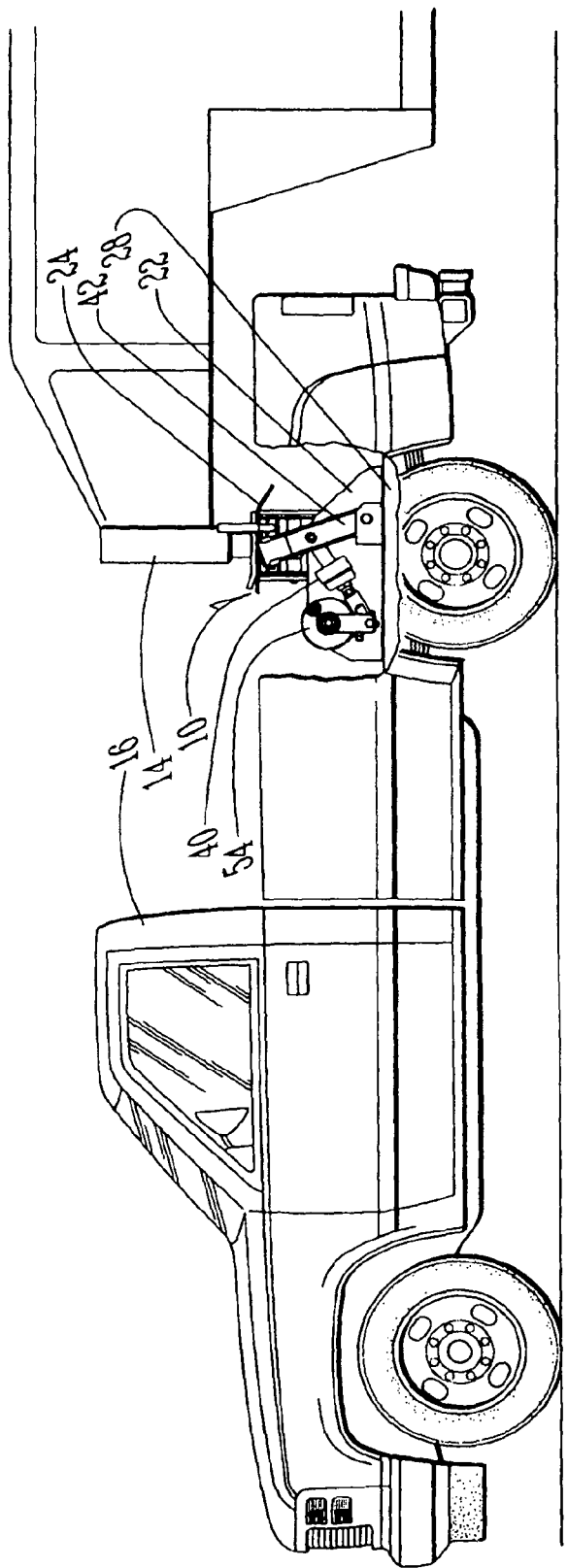
FIG. 1 is a side elevational view of a fifth wheel trailer connected to a towing vehicle via a slidable fifth wheel hitch having an automatically locking latch in accordance with the present invention.
Figure 2:
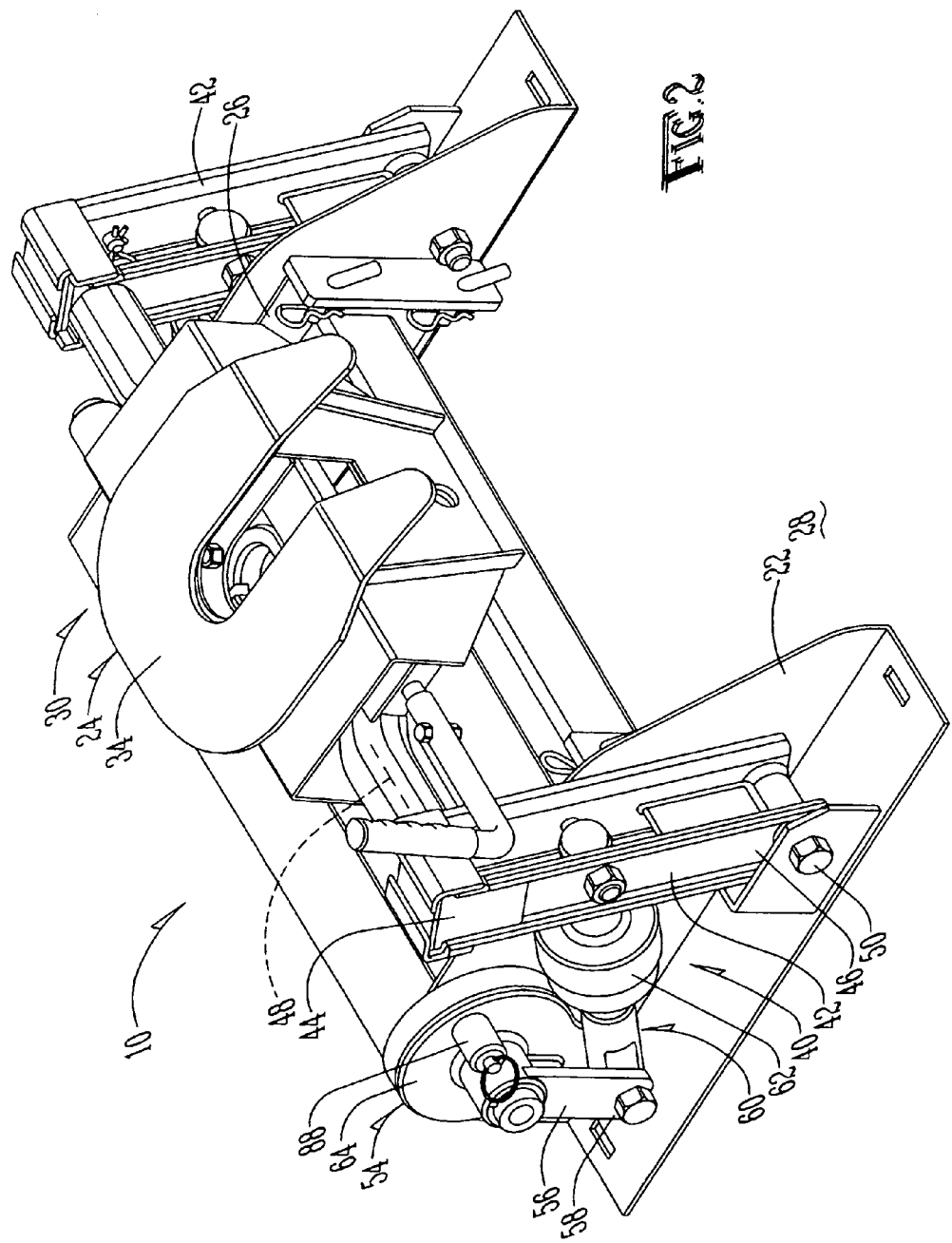
FIG. 2 is an enlarged, perspective view showing the slidable fifth wheel hitch at a forward towing station.

The reference numeral 10 generally refers to a slidable fifth wheel hitch apparatus structured to connect a kingpin of a gooseneck or fifth wheel trailer 14 to a towing vehicle 16 in accordance with the present invention as shown in FIGS. 1 through 12. The slidable fifth wheel hitch 10 includes a base platform 22 and a hitch platform 24 as shown in FIG. 2.

Figure 3:
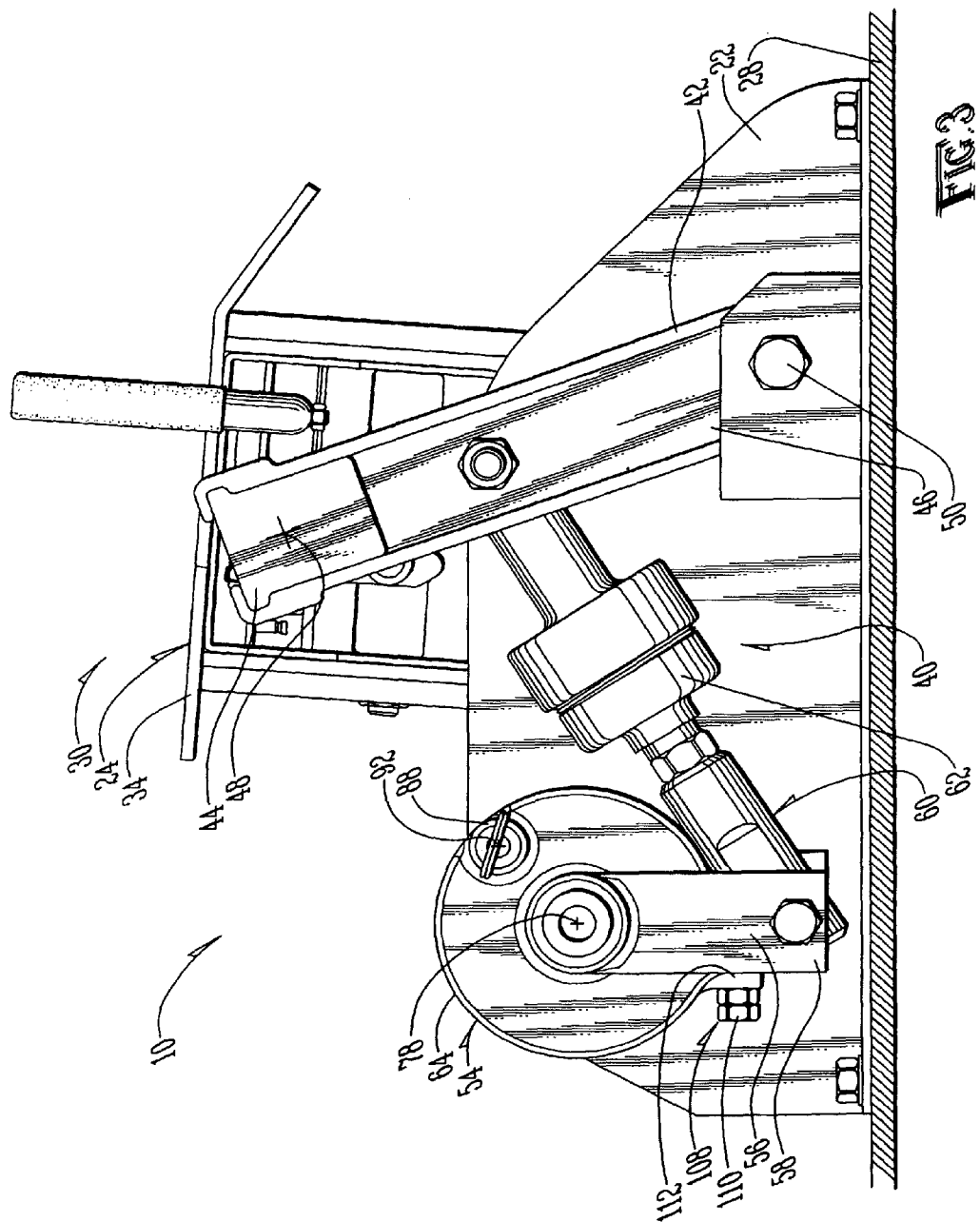
FIG. 3 is an enlarged side elevational view, similar to FIG. 2, showing the slidable fifth wheel hitch at the forward towing station.

The base platform 22, which has a pair of opposing rails 26, is securely mounted to a bed 28 of the towing vehicle 16. The hitch platform 24 is slidably mounted on the rails 26 of the base platform 22, as shown in FIG. 2. The hitch platform 24 is displaceable to and from a forward towing configuration or station 30 relative to the base platform 22 as shown in FIG. 3, and a rearward towing configuration or station 32 as shown in FIG. 8. A hitch head 34 is mounted to the hitch platform 24 to pivotally and releasably receive the kingpin of the fifth wheel trailer 14.

An articulating mechanism 40 includes a pivot bar 42 having an upper end 44 and a lower end 46, wherein the upper end 44 is pivotally connected to the hitch platform 24 to pivot about a transverse horizontally-oriented first pivot axis 48 relative to the hitch platform 24, and the lower end 46 is pivotally connected to the base platform 22 to pivot about a transverse horizontally-oriented second pivot axis 50 relative to the base platform 22.

A latch 54, which includes a pivot arm 56 with a distal end 58, is mounted to the base platform 22. A linkage mechanism 60 pivotally connects the pivot bar 42 to the latch 54 wherein one end of the linkage mechanism 60 is pivotally connected to the pivot bar 42 intermediately between the upper and lower ends 44, 46 thereof, and the other end of the linkage mechanism 60 is pivotally connected to the distal end 58 of the pivot arm 56 of the latch 54. Preferably, the linkage mechanism 60 includes a shock-absorbing device 62 to cushion buffeting forces between the hitch platform 24 and the base platform 22.

Figure 5:
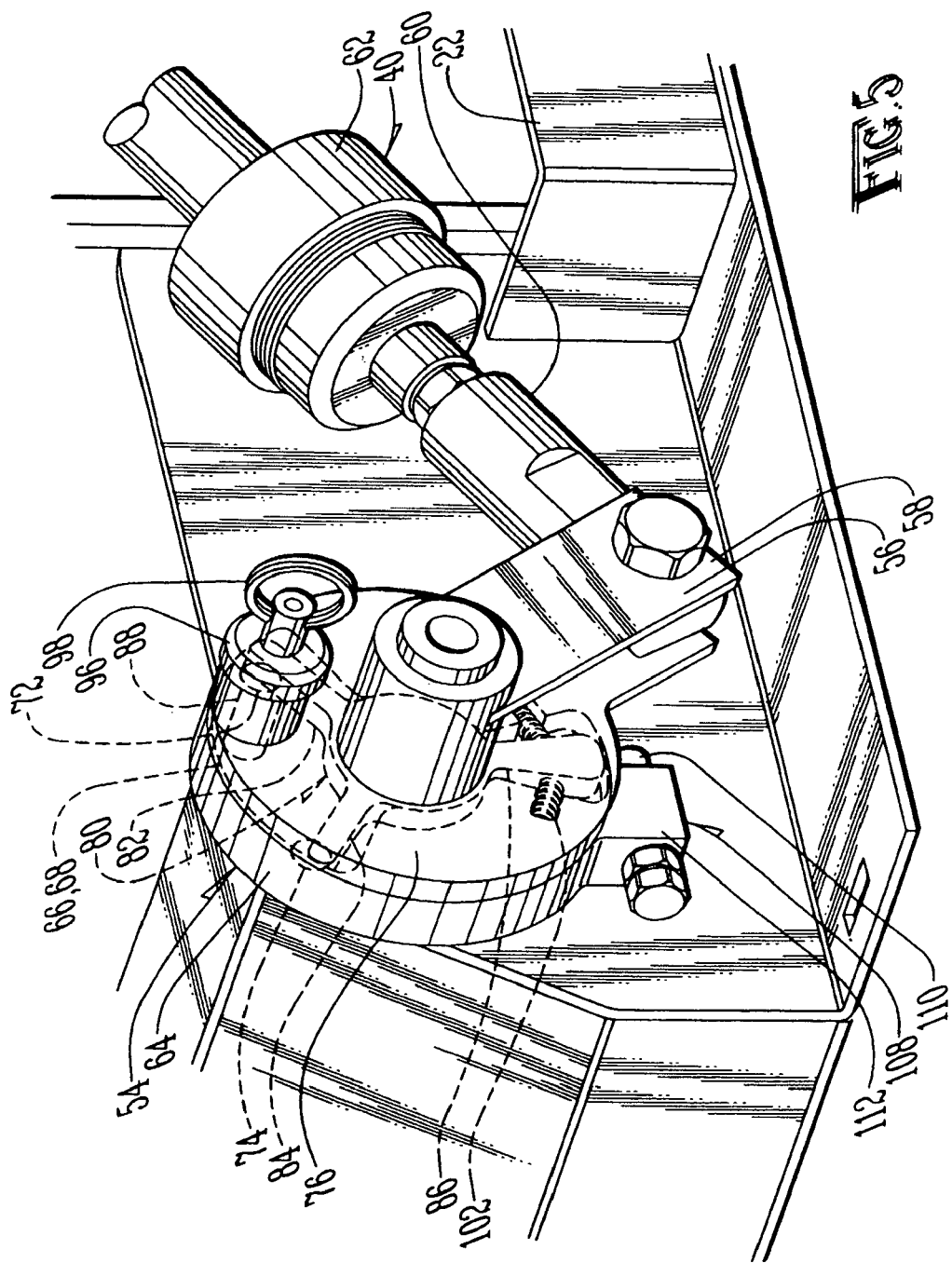
FIG. 5 is an enlarged and fragmentary, perspective view a hub, pin-mounting portion and latch pin of a latch of the slidable fifth wheel hitch, and also showing a spider device of the latch in dashed lines.

The latch 54 also includes a hub 64 fixedly secured to the base platform 22 wherein the hub 64 includes a recess 66 formed therein, the recess 66 having an inner wall 68. The latch 56 further includes a rearward bore 72 with a rearward bore axis 73, a forward bore 74 with a forward bore axis (not shown) positioned in the recess 66, a pin-mounting portion 76 fixedly secured to the pivot arm 58 to pivot about a transverse horizontally-oriented latch axis 78, and a planar spider device 80 with a rearward leg 82, a forward leg 84 and a biased leg 86, the spider device 80 being pivotally mounted in the recess 66 of the hub 64 to also pivot about the latch axis 78 relative to the base platform 22. A latch pin 88 with a distal end 90 and a pin axis 92 is slidably mounted in the pin-mounting portion 76, as shown in FIG. 5, the pin-mounting portion 76 being structured to prevent the latch pin 88 from being inadvertently removed therefrom.

A pin-biasing mechanism 96, such as a coil spring for example, biases the latch pin 88 inwardly toward the inner wall 68. When the hitch platform 24 is positioned at the forward towing station 30, pin axis 92 of the latch pin 88 is aligned with axis 73 of the rearward bore 72, and when the hitch platform 24 is positioned at the rearward towing station 32, pin axis 92 of the latch pin 88 is aligned with the (unshown) axis of the forward bore 74.

A release device 98 is provided for selectively unlocking the hitch platform 24 from the forward and rearward towing stations 30, 32 which enables a user to withdraw the latch pin 88 from the rearward and forward bores 72, 74. For example, the release device 98 may be a grip wherein a user can manually pull outwardly on the latch pin 88. Optionally, a solenoid 99 connected to an energy source 100, such as the electrical system of the towing vehicle for example, may be provided which enables an operator working alone to remotely displace the latch pin 88 outwardly from the rearward and forward bores 72, 74 to thereby unlock the hitch platform 24 from the forward and rearward towing stations 30, 32.

The latch 54 further includes a spider-biasing mechanism 102 which normally positions rearward leg 82 adjacent to rearward bore 72 and forward leg 84 adjacent to forward bore 74 to thereby interfere with entry of the latch pin 88 into the forward and rearward bores 72, 74.

Figure 6:
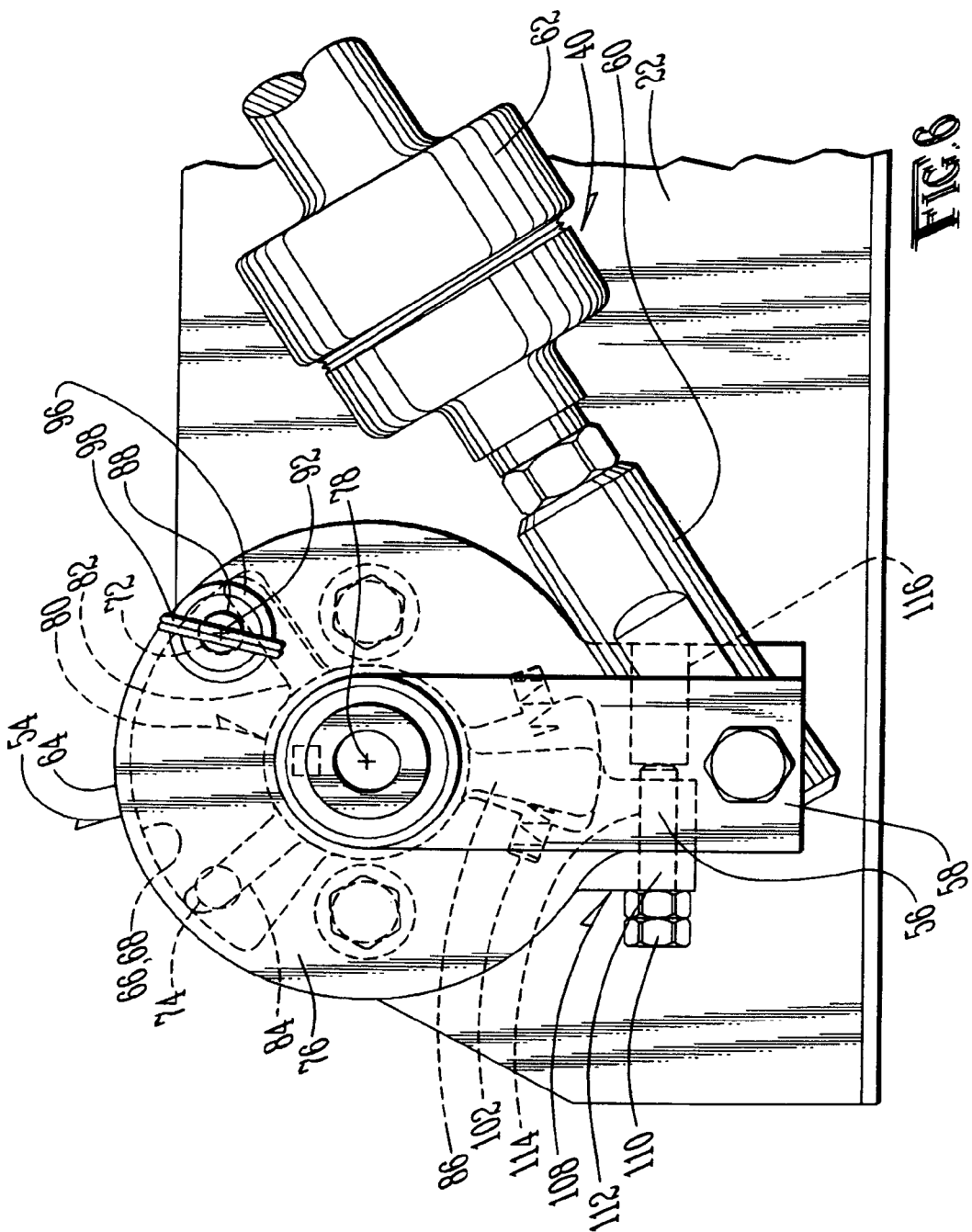
FIG. 6 is a further enlarged and fragmentary, side elevational view showing the latch of the slidable fifth wheel hitch locked at a forward towing station.

The slidable fifth wheel hitch 10 further includes an adjustable stop 108 structured to enable minor pivotal adjustments of the pin-mounting portion 76 relative to the hub 64 to provide anti-shear support for the latch pin 88 when the latch pin 88 locks the slidable fifth wheel hitch 10 at a towing station and to facilitate withdrawal of the latch pin 88 from a bore to unlock the slidable fifth wheel hitch 10 from a towing station. For example, the adjustable stop 108 may include an adjuster 110 such as a bolt, a first portion 112 fixedly secured to the hub 64 and having a threaded orifice 114 therethrough, and a second portion 116 fixedly secured to the pivot arm 56, as shown in FIGS. 6, 8 and 12.

In an application of the present invention wherein a user desires to move the hitch platform 24 from the forward towing station 30, as shown in FIG. 3, to the rearward towing station 32, as shown in FIG. 8, the latch pin 88 is withdrawn outwardly until the distal end 90 thereof is displaced out of the plane of the spider device 80. As hereinafter described, when the latch pin 88 is so withdrawn, the spider-biasing mechanism 102 responsively rotates the spider device 80 counterclockwise about the latch axis 78 causing leg 82 to be inserted between the latch pin 88 and the rearward bore 72 thereby preventing the pin-biasing mechanism 96 from biasing the latch pin 88 back into the rearward bore 72.

Then, as the hitch platform 24 is moved rearwardly from the forward towing station 30 toward the rearward towing station 32, such as by moving the towing vehicle slowly forwardly away from the fifth wheel trailer for example, the upper end 44 of the pivot bar 42 is displaced rearwardly relative to the lower end 46 of the pivot bar 42 while the linkage mechanism 60 causes the pin-mounting portion 76 and the latch pin 88 to be rotated counterclockwise about the latch axis 78.

As the hitch platform 24 continues to be moved rearwardly, such that the latch pin 88 no longer abuttingly engages the side of leg 82, the pin-biasing mechanism 96 biases the latch pin 88 such that it bears against the inner wall 68 of the recess 66 and such that the distal end 90 of the latch pin 88 extends into the plane of the spider device 80. As the pin-mounting portion 76 and latch pin 88 continue to be pivoted counterclockwise, the latch pin 88 bears against the edge of leg 84, as suggested in FIG. 10.

Then, the latch pin 88 urges the spider device 80 further counterclockwise until leg 84 no longer interferes with access of the latch pin 88 into the forward bore 74, as indicated by the arrow designated by numeral 122 in FIG. 10, and pin axis 92 of the latch pin 88 becomes aligned with the (unshown) axis of the forward bore 74 whereupon the pin-biasing mechanism 96 biases the latch pin 88 into the forward bore 74 to thereby lock the hitch platform 24 at the rearward towing station 32.

Subsequently, when the user desires to move the hitch platform 24 from the rearward towing station 32 to the forward towing station 32, the latch pin 88 is again withdrawn outwardly until the distal end 90 thereof is again displaced clear of the plane of the spider device 80 whereupon the spider-biasing mechanism 102 responsively pivots the spider device 80 clockwise about the latch axis 78 causing leg 84 to be inserted between the latch pin 88 and the forward bore 74 thereby preventing the pin-biasing mechanism 96 from biasing the latch pin 88 back into the forward bore 74.

As the hitch platform 24 is moved forwardly from the rearward towing station 32 toward the forward towing station 30, such as by moving the towing vehicle slowly rearwardly toward the fifth wheel trailer for example, the upper end 44 of the pivot bar 42 is displaced forwardly relative to the lower end 46 of the pivot bar 42 while the linkage mechanism 60 causes the pin-mounting portion 76 and the latch pin 88 to be rotated clockwise about the latch axis 78.

As the hitch platform 24 continues to be moved forwardly such that the latch pin 88 no longer abuttingly engages the side of leg 84, the pin-biasing mechanism 96 biases the latch pin 88 such that it bears against the inner wall 68 of the recess 66 and such that the distal end 90 of the latch pin 88 extends into the plane of the spider device 80. As the pin-mounting portion 76 and latch pin 88 continue to be pivoted clockwise, the latch pin 88 bears against the edge of leg 82 urging the spider device 80 further clockwise until leg 82 no longer interferes with access of the latch pin 88 into the rearward bore 72, as indicated by the arrow designated by numeral 124 in FIG. 11 whereupon the pin-biasing mechanism 96 biases the latch pin 88 into the rearward bore 72 to thereby lock the hitch platform 24 at the forward towing station 30.

In other words, when the hitch platform 24 is locked at the forward towing station 30 or the rearward towing station 32, the biased leg 86 of the spider device 80 is loaded by the spider-biasing mechanism 102 to automatically bias legs 82, 84 to thereby prevent re-entry of the latch pin 88 into the respective rearward or forward bore 92, 94 when the latch pin 88 is withdrawn outwardly and clear of the plane of the spider device 80 until the latch pin 88 has been displaced past the respective leg 82 or 84 so the latch pin 88 can bear against and displace the spider device 80 to again gain access to the rearward and forward bores 72, 74.

Figure 4:
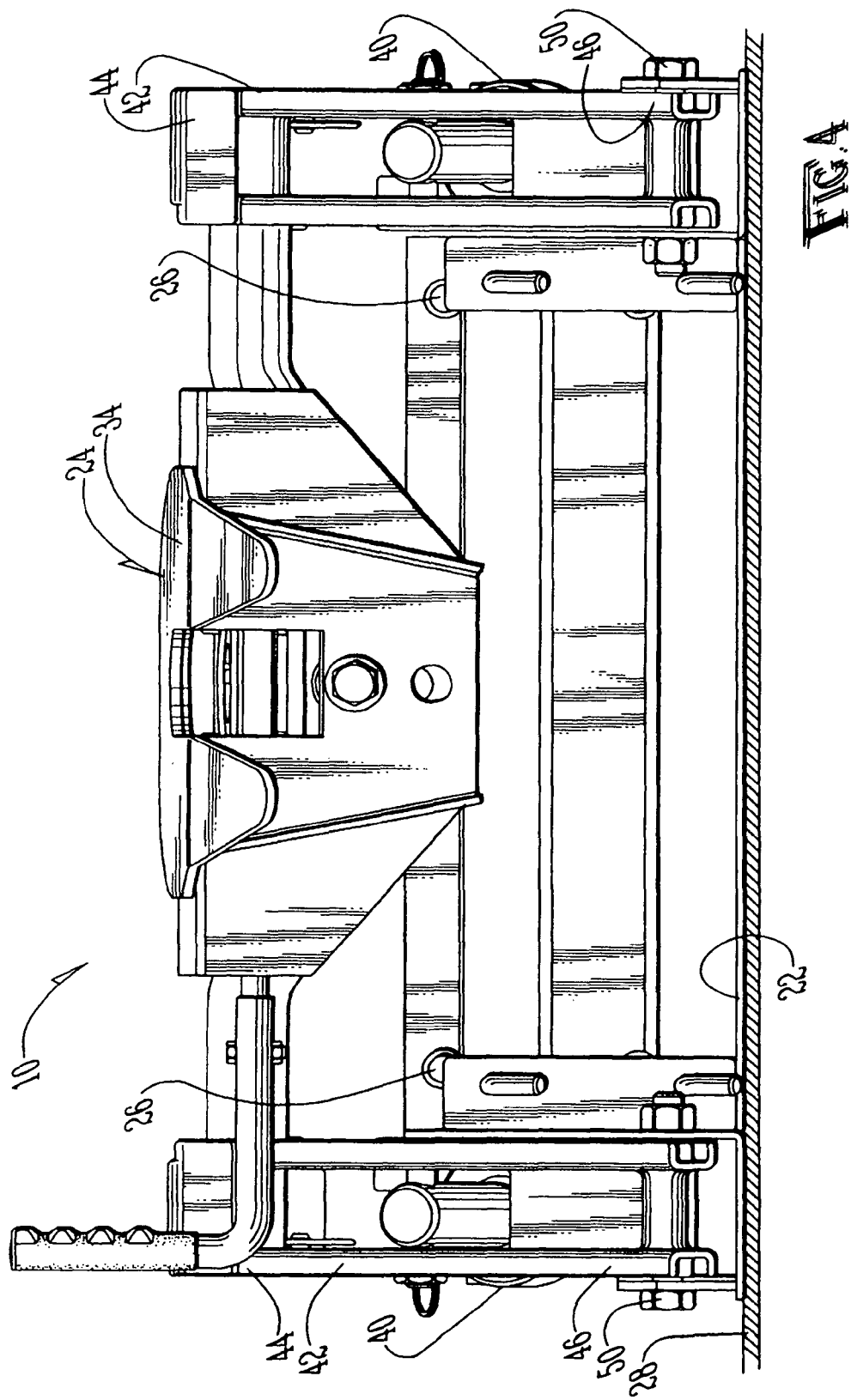
FIG. 4 is an enlarged rear elevational view, similar to FIG. 2, showing an optional alternative wherein a latch and articulating mechanism of the slidable fifth wheel hitch is mounted at each side of a base platform thereof.

For some applications, it may be desirable to have an opposing pair of the latches, one latch arranged on each side of the fifth wheel slider hitch as shown in FIG. 4.

It is to be understood that while certain forms of the present invention have been illustrated and described herein, it is not to be limited to the specific forms or arrangement of parts as described and shown.

What is claimed and desired to be covered by Letters Patent is as follows:

1. An apparatus for connecting a kingpin of a gooseneck or fifth wheel trailer to a towing vehicle, the apparatus comprising:
    (a) a fifth wheel hitch including:
        (1) a base platform having rails and being mountable on a bed of a towing vehicle, and
        (2) a hitch platform having a hitch head and being slidably mounted on the rails of the base platform, the hitch platform being displaceable to and from a forward towing station and a rearward towing station relative to the base platform;
    (b) an articulating mechanism pivotally connecting the hitch platform to the base platform and being structured to displace the hitch platform to and from the forward towing station and the rearward towing station; and
    (c) a latch mounted to the base platform about a latch axis and being structured to:
        (1) automatically and releasably lock the hitch platform at the forward and rearward towing stations when the hitch platform is displaced to the forward and rearward towing stations, and
        (2) subsequently when the hitch platform is released from the forward or rearward towing station, automatically prevent the latch from re-locking the hitch platform at that forward or rearward towing station until the hitch platform has been displaced away from that forward or rearward towing station.

2. An apparatus as described in claim 1, wherein the articulating mechanism includes:
    (a) the latch having a pivot arm with a distal end;
    (b) a pivot bar having an upper end pivotally connected to the hitch platform and a lower end pivotally connected to the base platform; and
    (c) a linkage mechanism having one end thereof pivotally connected to the pivot bar intermediately between the upper and lower ends of the pivot bar, and the other end thereof pivotally connected to the distal end of the pivot arm of the latch.

3. An apparatus as described in claim 2, wherein the latch further comprises:
    (a) a pin-mounting portion fixedly secured to the pivot arm and mounted to pivot about the latch axis;
    (b) a rearward bore having a rearward bore axis;
    (c) a latch pin mounted in the pin-mounting portion and having a pin axis oriented parallel to the rearward bore axis; and
    (d) a pin-biasing mechanism structured to bias the latch pin along the pin axis;
    (e) the latch being structured to automatically lock the hitch platform at the forward towing station when the pin axis is aligned with the rearward bore axis and the pin-biasing mechanism biases the latch pin into the rearward bore.

4. An apparatus as described in claim 3, wherein the latch further comprises:
    (a) a spider device having a rearward leg and being structured to pivot about the latch axis; and
    (b) a spider-biasing mechanism structured to normally position the rearward leg adjacent to the rearward bore to thereby interfere with entry of the latch pin into the rearward bore;
    (c) the latch being structured wherein, as the hitch platform is being displaced to the forward towing station, the latch pin bears against the rearward leg and pivotally displaces the spider device wherein the rearward leg of the spider device is pivotally displaced to thereby allow access into the rearward bore by the latch pin.

5. An apparatus as described in claim 2, wherein the latch further comprises:
    (a) a pin-mounting portion fixedly secured to the pivot arm and mounted to pivot about the latch axis;
    (b) a forward bore having a forward bore axis;
    (c) a latch pin mounted in the pin-mounting portion and having a pin axis oriented parallel to the forward bore axis; and
    (d) a pin-biasing mechanism structured to bias the latch pin along the pin axis;
    (e) the latch being structured to automatically lock the hitch platform at the rearward towing station when the pin axis is aligned with the forward bore axis and the pin-biasing mechanism biases the latch pin into the forward bore.

6. An apparatus as described in claim 5, wherein the latch further comprises:
    (a) a spider device having a forward leg and being structured to pivot about the latch axis; and
    (b) a spider-biasing mechanism structured to normally position the forward leg adjacent to the forward bore to thereby interfere with entry of the latch pin into the forward bore;
    (c) the latch being structured wherein, as the hitch platform is being displaced to the rearward towing station, the latch pin bears against the forward leg and pivotally displaces the spider device wherein the forward leg of the spider device is pivotally displaced to thereby allow access into the forward bore by the latch pin.

7. An apparatus as described in claim 2, wherein the latch comprises:
    (a) a pin-mounting portion fixedly secured to the pivot arm and mounted to pivot about the latch axis;
    (b) a forward bore having a forward bore axis and a rearward bore having a rearward bore axis;
    (c) a latch pin mounted in the pin-mounting portion and having a pin axis oriented parallel to the forward and rearward bore axes; and
    (d) a pin-biasing mechanism structured to bias the latch pin along the pin axis;

(e) the latch being structured to:
  (1) automatically lock the hitch platform at the forward towing station when the pin axis is aligned with the rearward bore axis and the pin-biasing mechanism biases the latch pin into the rearward bore, and
  (2) automatically lock the hitch platform at the rearward towing station when the pin axis is aligned with the forward bore axis and the pin-biasing mechanism biases the latch pin into the forward bore.

8. An apparatus as described in claim 7, wherein the latch further comprises:
  (a) a spider device having a forward leg and a rearward leg, the spider device being structured to pivot about the latch axis; and
  (b) a spider-biasing mechanism structured to normally position the rearward leg adjacent to the rearward bore to thereby interfere with entry of the latch pin into the rearward bore, and to normally position the forward leg adjacent to the forward bore to thereby prevent entry of the latch pin into the forward bore;
  (c) the latch being structured wherein:
    (1) as the hitch platform is being displaced to the forward towing station, the latch pin bears against the rearward leg and pivotally displaces the spider device wherein the rearward leg of the spider device is displaced to thereby allow access into the rearward bore by the latch pin, and
    (2) as the hitch platform is being displaced to the rearward towing station, the latch pin bears against the forward leg and pivotally displaces the spider device wherein the forward leg of the spider device is displaced to thereby allow access into the forward bore by the latch pin.

9. An apparatus as described in claim 7, wherein the latch further comprises:
  (a) the latch having a hub with a recess including an inner wall;
  (b) the rearward and forward bores being located in the recess; and
  (c) a stop mechanism structured to enable selective adjustment of the angular orientation of the pin-mounting portion about the latch axis relative to the hub.

10. An apparatus as described in claim 7, further comprising a release device structured to withdraw the latch pin from the rearward and forward bores.

11. An apparatus as described in claim 10, wherein the release device includes a grip.

12. An apparatus as described in claim 10, wherein the release device includes:
  (a) a solenoid; and
  (b) an energy source for selectively activating the solenoid.

13. An apparatus as described in claim 2, wherein the linkage mechanism includes a shock-absorbing device.

14. An apparatus for connecting a kingpin of a gooseneck or fifth wheel trailer to a towing vehicle, the apparatus comprising:
  (a) a fifth wheel hitch including:
    (1) a base platform having rails and being mountable on a bed of a towing vehicle, and
    (2) a hitch platform having a hitch head and being slidably mounted on the rails of the base platform, the hitch platform being displaceable to and from a forward towing station and a rearward towing station relative to the base platform;
  (b) a latch including:
    (1) a pin-mounting portion mounted to the base platform to pivot about a latch axis,
    (2) a pivot arm fixedly secured to the pin-mounting portion and having a distal end,
    (3) a hub fixedly secured to the base platform and having a recess with an inner wall,
    (4) a rearward bore having a rearward bore axis and a forward bore having a forward bore axis, the rearward and forward bores being located in the recess,
    (5) a latch pin mounted in the pin-mounting portion and having a pin axis oriented parallel to the rearward and forward bore axes,
    (6) a pin-biasing mechanism structured to bias the latch pin along the pin axis toward the inner wall of the recess,
    (7) a spider device having a rearward leg and a forward leg, the spider device being structured to pivot about the latch axis, and
    (8) a spider-biasing mechanism structured to normally position:
      (A) the rearward leg adjacent to the rearward bore to thereby interfere with entry of the latch pin into the rearward bore, and
      (B) the forward leg adjacent to the forward bore to thereby interfere with entry of the latch pin into the forward bore,
    (9) the latch being structured wherein:
      (A) as the hitch platform is being displaced to the rearward towing station, the latch pin bears against the forward leg and pivotally displaces the spider device wherein the forward leg of the spider device is displaced to thereby allow access into the forward bore by the latch pin to thereby automatically lock the hitch platform at the rearward towing station, and
      (B) as the hitch platform is being displaced to the forward towing station, the latch pin bears against the rearward leg and pivotally displaces the spider device wherein the rearward leg of the spider device is displaced to thereby allow access into the rearward bore by the latch pin to thereby automatically lock the hitch platform at the forward towing station;
  (c) an articulating mechanism pivotally structured to displace the hitch platform to and from the forward towing station and the rearward towing station, the articulating mechanism including:
    (1) a pivot bar having an upper end pivotally connected to the hitch platform and a lower end pivotally connected to the base platform, and
    (2) a linkage mechanism having one end thereof pivotally connected to the pivot bar intermediately between the upper and lower ends of the pivot bar, and the other end thereof pivotally connected to the distal end of the pivot arm of the latch, the linkage mechanism including a shock-absorbing device structured to cushion buffeting forces between the hitch and base platforms; and
  (d) a release device structured to enable withdrawal of the latch pin from the rearward and forward bores;
  (e) wherein as the hitch platform is being released from the rearward towing station, the spider-biasing mechanism pivotally and automatically biases the spider device to thereby prevent the latch pin from re-entering the forward bore until after the hitch platform has been displaced away from the rearward towing station, and wherein as the hitch platform is being released from the forward towing station, the spider-biasing mechanism pivotally and automatically biases the spider device to thereby prevent the latch pin from re-entering the rearward bore until after the hitch platform has been displaced away from the forward towing station.

* * * * *